US005100608A

United States Patent [19]

Konomura et al.

[11] Patent Number: 5,100,608

[45] Date of Patent: Mar. 31, 1992

[54] IN-CORE NUCLEAR INSTRUMENTATION FOR FAST BREEDER REACTORS

[75] Inventors: Mamoru Konomura; Hisashi Nakamura, both of Oarai, Japan

[73] Assignee: Doryokuro Kakunenryo Kaihatsu Jigyodan, Tokyo, Japan

[21] Appl. No.: 499,204

[22] Filed: Mar. 23, 1990

Related U.S. Application Data

[63] Continuation-in-part of Ser. No. 241,176, Sep. 7, 1988, abandoned.

[30] Foreign Application Priority Data

Sep. 22, 1987 [JP] Japan ................................ 62-238474

[51] Int. Cl.[5] ........................ G21C 17/12; G21C 1/02

[52] U.S. Cl. .................................... 376/171; 376/254; 376/327

[58] Field of Search ............... 376/327, 336, 337, 254, 376/255, 171

[56] References Cited

U.S. PATENT DOCUMENTS

| | | | |
|---|---|---|---|
| 3,976,540 | 8/1976 | Sowa | 376/336 |
| 4,019,954 | 4/1977 | Giordana et al. | 376/234 |
| 4,045,283 | 8/1977 | Noyes et al. | 376/254 |
| 4,138,320 | 2/1979 | Grantz | 376/337 |
| 4,139,414 | 2/1979 | Giuggio et al. | 376/337 |
| 4,204,909 | 5/1980 | Giuggio et al. | 376/336 |
| 4,208,247 | 6/1980 | Impink, Jr. | 376/327 |
| 4,298,430 | 11/1981 | Rolstad et al. | 376/254 |
| 4,304,632 | 12/1981 | Bhate et al. | 376/336 |
| 4,325,785 | 4/1982 | Klotz et al. | 376/254 |
| 4,582,675 | 4/1986 | Germer | 376/336 |
| 4,770,845 | 9/1988 | Barrus et al. | 376/336 |

*Primary Examiner*—Harvey E. Behrend
*Attorney, Agent, or Firm*—Armstrong, Nikaido, Marmelstein, Kubovcik & Murray

[57] ABSTRACT

In-core nuclear instrumentation for a fast breeder reactor includes a neutron flux measuring unit disposed in a control rod assembly, whereby it is possible to measure a change in in-core neutron flux reliably and highly accurately without requiring a major modification in core design.

3 Claims, 5 Drawing Sheets

(WHILE FUEL EXCHANGE)

(WHILE SCRAM)

(WHILE NORMAL OPERATION)

IN-CORE NUCLEAR INSTRUMENTATION FOR FAST BREEDER REACTORS

This application is a continuation-in-part of application Ser. No. 241,176 filed Sept. 7, 1988 now abandoned.

BACKGROUND OF THE INVENTION

This invention relates to nuclear instrumentation for fast breeder reactors. More particularly, the invention relates to fast breeder reactor in-core nuclear instrumentation suitable for direct measurement of in-core neutron flux for such purposes as control of the degree of core fuel burn-up and detection of core anomaly.

When controlling the degree of burn-up of core fuel in a light-water reactor, the general practice is to measure in-core neutron flux distribution and operate control rods based on these measurements. The reason for this is as follows: If an anomaly should develop inside the core, neutron flux is affected first, after which the fuel produces heat causing a rise in the temperature of the coolant. This appears as a change in temperature at the outlet of the core. Therefore, in order to grasp these conditions, a quicker response is attained by measuring neutron flux, which is a primary quantity, rather than temperature change, which is a secondary quantity.

In the case of a fast breeder reactor, the neutron flux distribution is simpler than that seen in a light-water reactor. It has been contemplated, therefore, to measure the change in in-core neutron flux outside the core. As shown in FIG. 6, neutron flux measuring units 2 are disposed on the inner side of a reactor vessel chamber wall 23 and on the outer side of a core 24 to measure the change in neutron flux.

In this conventional nuclear instrumentation for a fast breeder reactor in which the neutron flux measuring units 2 are arranged on the outer side of the core 24, accurate measurement can be performed with regard to small and medium size reactors such as experimental and prototype reactors. However, accurate measurement is not always possible in demonstration or commercial reactors having a large sized core. Moreover, when a heterogeneous core (heterogeneous in the axial and diametric directions) is employed in a demonstration or commercial class reactor, measuring in-core neutron distribution accurately is difficult with the conventional nuclear instrumentation.

Furthermore, in order to measure in-core neutron flux in a commercial-class light-water reactor, a special instrumentation channel generally is provided in the core. However, in order to apply this to a fast breeder reactor, a major modification in core design is required.

SUMMARY OF THE INVENTION

Accordingly, an object of the present invention is to provide in-core nuclear instrumentation for a fast breeder reactor in which, even if a heterogeneous core is employed in a demonstration or commercial reactor having a large core, a change in neutron flux within the core can be measured reliably and accurately without requiring a major modification in the design of the conventional core.

According to the present invention, the foregoing object is attained by arranging a neutron flux measuring unit in a control rod assembly in nuclear instrumentation for a fast breeder reactor.

By disposing the neutron flux measuring unit in the control rod assembly, the in-core nuclear instrumentation for fast breeder reactors in accordance with the invention makes it possible to measure a change in in-core neutron flux reliably and accurately without a significant modification in core design.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Figure 1:
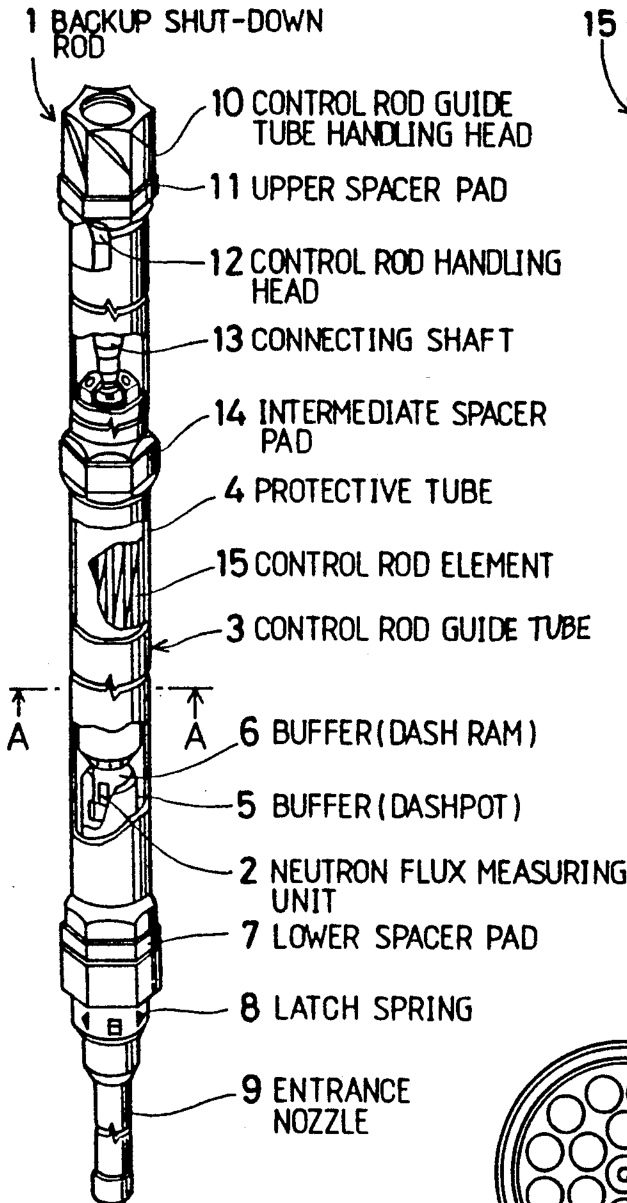
FIG. 1 is a perspective view, partially broken away, illustrating a backup shutdown rod and shows in detail the installation location of a neutron flux measuring unit in in-core nuclear instrumentation for fast breeder reactors in accordance with the present invention.
Figure 3:
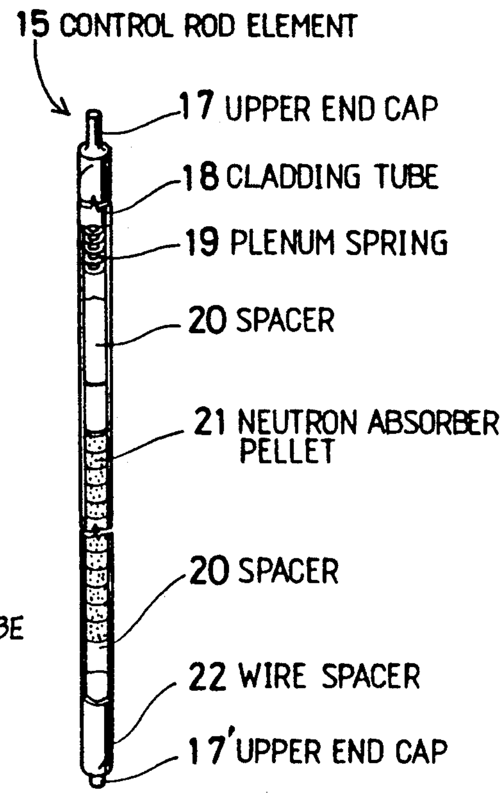
FIG. 3 is a perspective view, partially broken away, illustrating a control rod element.
Figure 2:
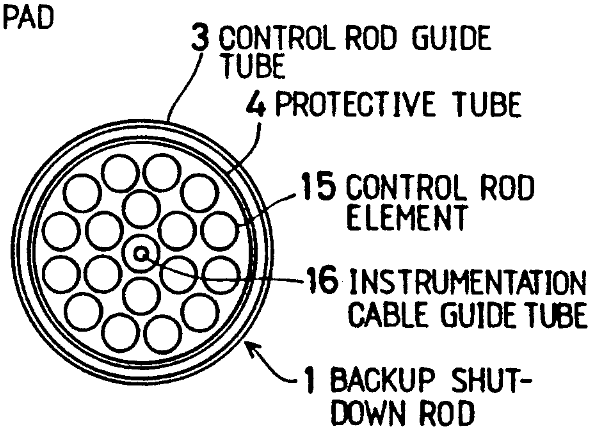
FIG. 2 is a sectional view of a control rod guide tube.
Figure 4:
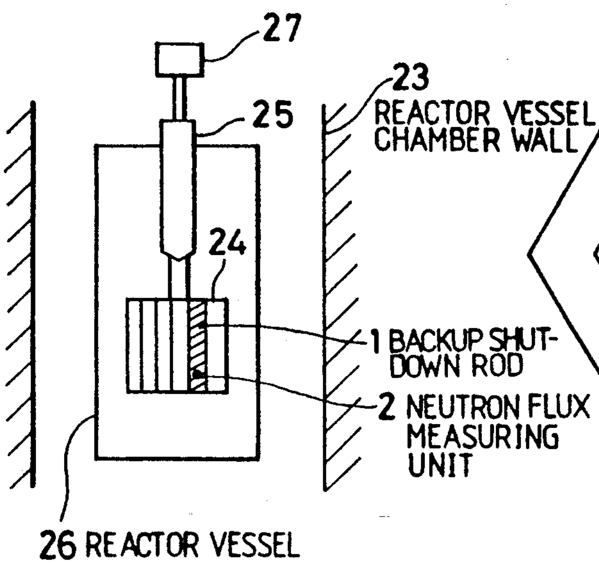
FIG. 4 is a view showing the overall construction of in-core nuclear instrumentation for fast breeder reactors in accordance with the invention.
Figure 5:
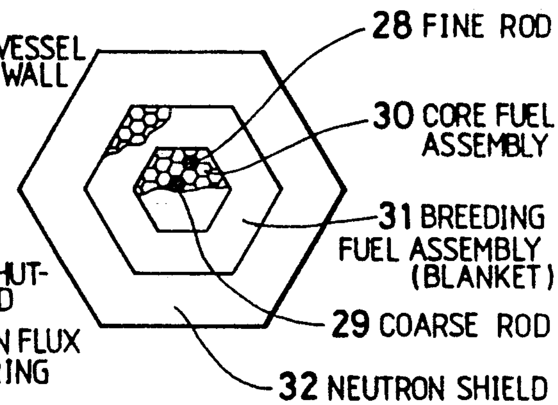
FIG. 5 is a view showing the arrangement of a core in a fast breeder reactor.
Figure 6:
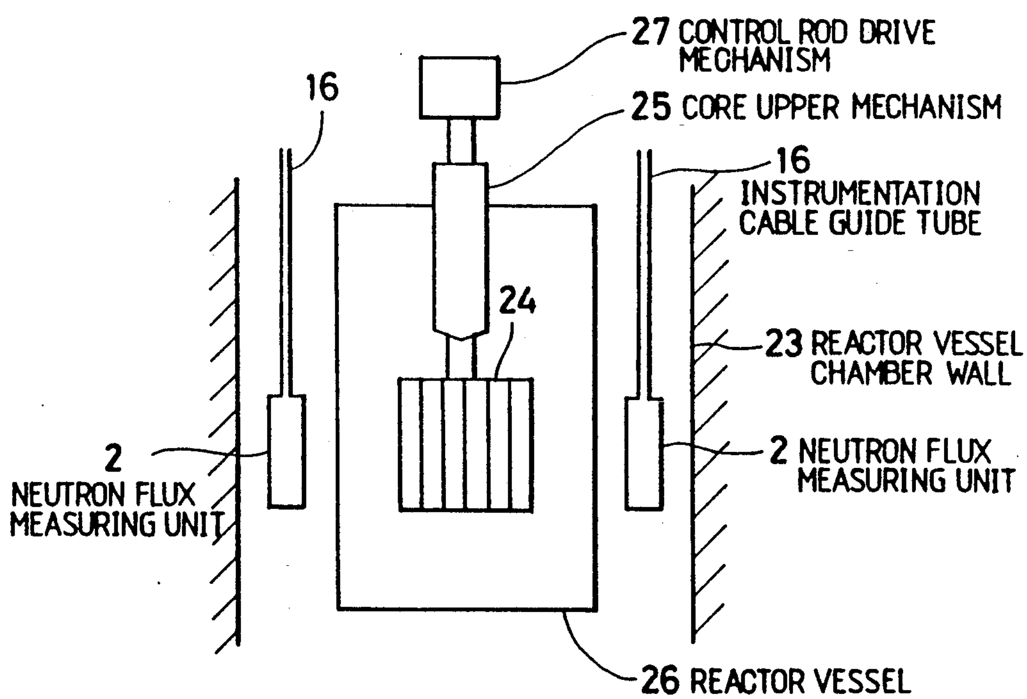
FIG. 6 is a longitudinal view of nuclear instrumentation in a conventional fast breeder reactor.
Figure 7:
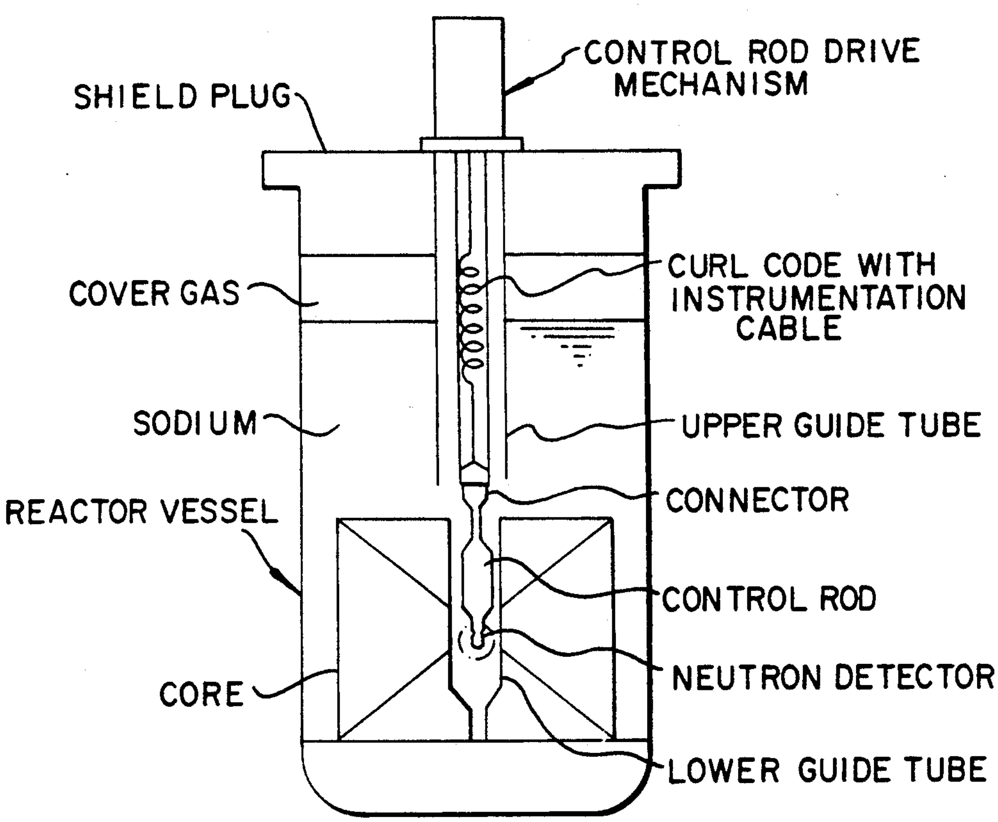
FIG. 7 is a schematic diagram of the fast breeder reactor showing an instrument cable for the neutron flux measuring unit passing through a central portion of the control rod assembly and lead out to an upper portion of the reactor core.
Figure 7A:
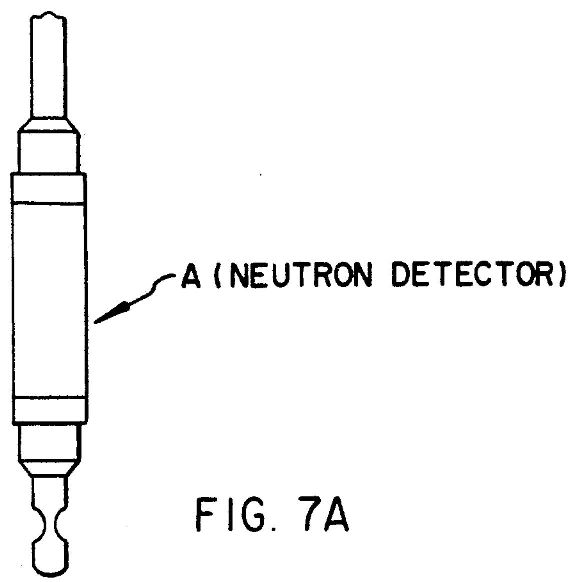
FIG. 7A is an enlarged view of the neutron detector of FIG. 7.
Figure 8:
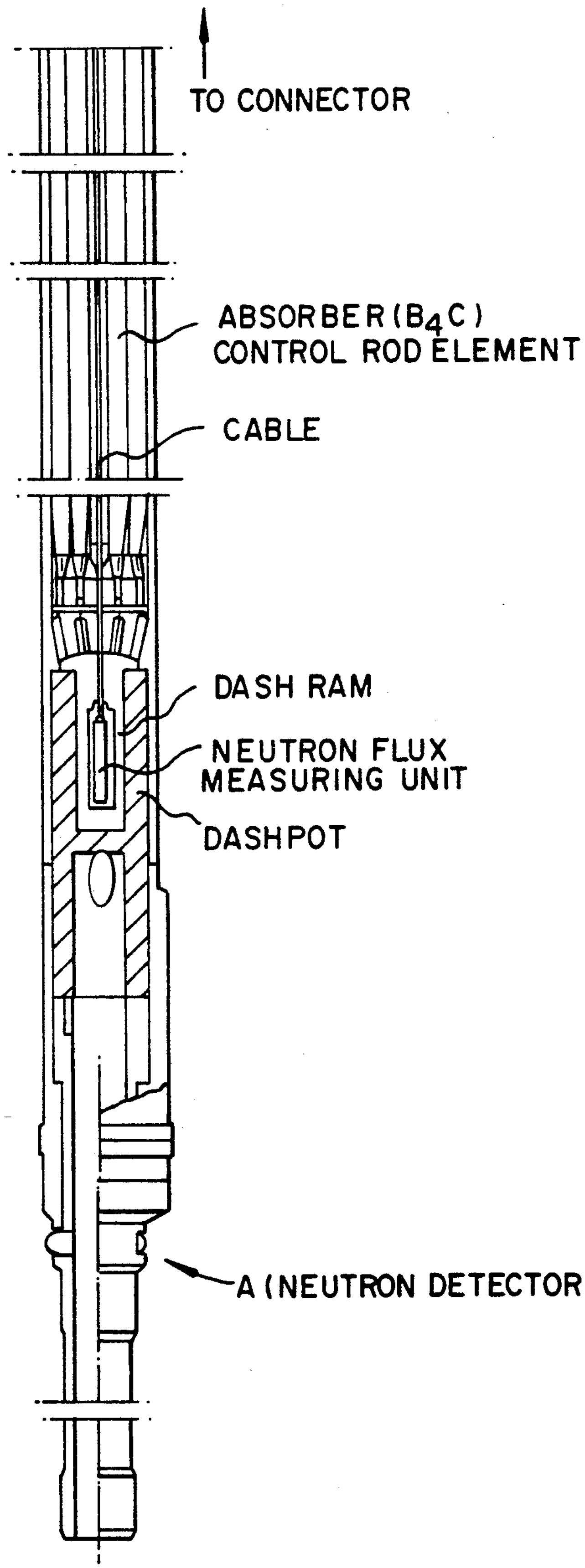
FIG. 8 further illustrates a sectional view of the structural arrangement in which the neutron flux measuring unit is provided with the instrument cable.
Figure 9C:
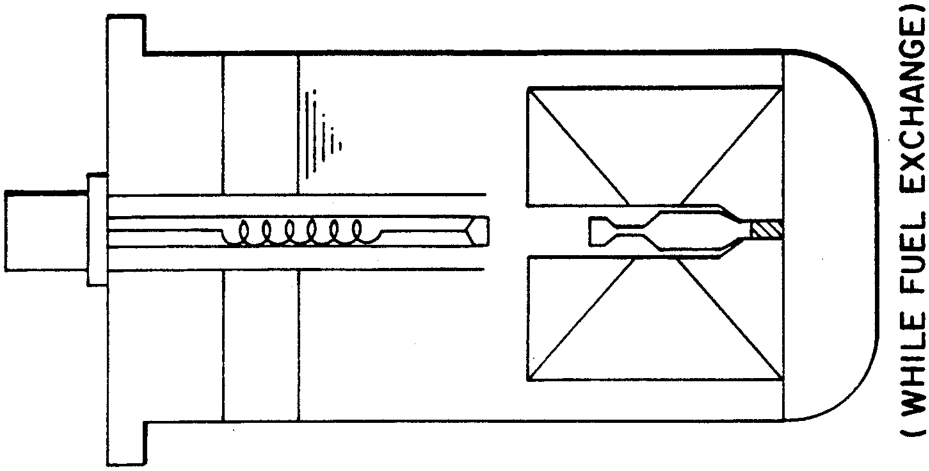
FIGS. 9A, 9B and 9C are schematic views showing the manner in which the control rod assembly with the neutron flux measuring unit instrument is positioned during core normal operation, scram and core refuel, respectively.
Figure 9B:
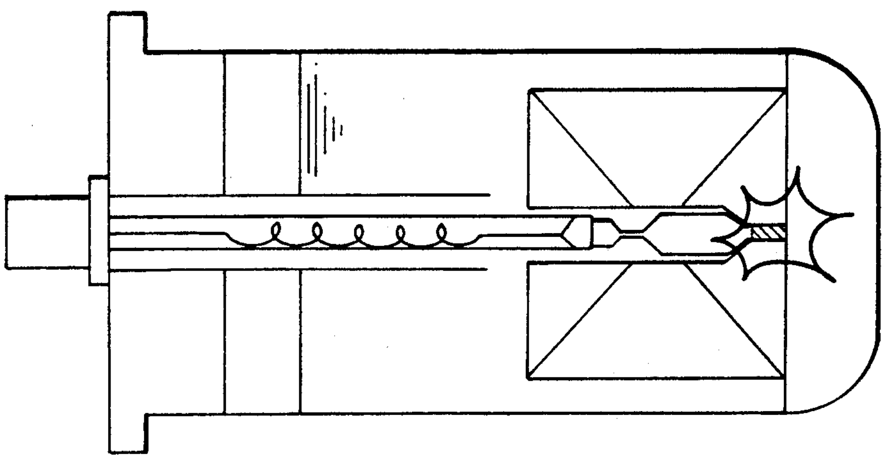
Figure 9A:
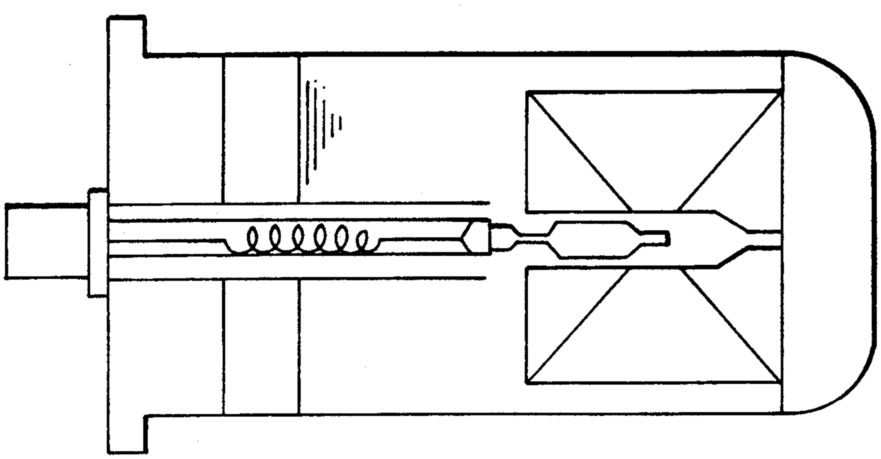

FIGS. 1 through 5 are views illustrating an embodiment of in-core nuclear instrumentation for fast breeder reactors in accordance with the present invention, in which FIG. 1 is view illustrating a backup shutdown rod and shows in detail the installation location of a neutron flux measuring unit, FIG. 2 is a view illustrating a control rod guide tube, FIG. 3 is a view illustrating a control rod element, FIG. 4 is a view showing the overall construction of in-core nuclear instrumentation for fast breeder reactors in accordance with the invention, and FIG. 5 is a view showing the arrangement of a core in a fast breeder reactor.

Shown in the Figures are a backup shutdown rod 1, a neutron flux measuring unit 2, a control rod guide tube 3, a protecting tube 4, a buffer (dashpot) 5, a buffer (dash ram) 6, a lower spacer pad 7, a latch spring 8, an entrance nozzle 9, a control rod guide tube handling head 10, an upper spacer pad 11, a control rod handling head 12, a connecting shaft 13, an intermediate spacer pad 14, a control rod element 15, an instrumentation cable guide tube 16, an upper end cap 17, a cladding tube 18, a plenum spring 19, a spacer 20, a neutron absorber pellet 21, a wire spacer 22, a reactor vessel chamber wall 23, a core 24, an upper mechanism 25, a reactor vessel 26, a control rod drive mechanism 27, a fine rod 28, a coarse adjustment rod 29, a core fuel assembly 30, a breeding fuel assembly 31, and a neutron shield 32.

The general features of the construction of the present invention will now be described with reference to FIGS. 4 and 5.

As shown in FIG. 5, the core 24 is so designed that the control rods, such as the fine rods 28 and coarse rods 29, are distributed uniformly within the fuel rods of the core and have substantially the same shape as the core fuel assemblies 30 and breeding fuel assemblies 31. The neutron shield 32 is provided outside these control rods. The backup shutdown rod 1, fine rods 28 and coarse rods 29 are all control rod assemblies for controlling the reactivity of the reactor. Ordinary start-up and shutdown of the reactor is performed by the fine and coarse rods. When it is impossible for both the fine and coarse rods to effect emergency shutdown of the reactor, this is carried out by the backup shutdown rod 1, the system whereof is different from that of the fine and coarse rod and which is capable of performing shutdown independently. As shown in FIG. 4, these control rod assemblies are operated by the control rod drive mechanism 27 via the core upper mechanism 25 at the upper part of the core.

In accordance with the present invention, the neutron flux measuring unit is arranged in one or a plurality of the control rods such as the backup shutdown rod, coarse rods and fine rods in order to measure neutron flux. By adopting such an arrangement, a change in the neutron flux within the core assemblies can be ascertained with a quick response since the control rods themselves occupy a single assembly portion of the fast breeder reactor and are distributed throughout the core.

The location at which the neutron flux measuring unit 2 is installed will now be described in detail with reference to FIGS. 1 through 3.

Each control rod element 15 (FIG. 3) comprises the cladding tube 18 accommodating a stack of the neutron absorber pellets 21. These control rod elements 15 are clustered within the protecting tube 4 (FIG. 2). As shown in FIG. 1, the connecting rod 13 is attached to the upper portion of the protecting tube 4 for being connected to the control rod handling head 12, which is adapted to be connected to the control rod drive mechanism 27 that carries out insertion and withdrawal. A dash ram 6 serving as a buffer is connected to the lower portion of the protecting tube 4. A dashpot 5 serving as a buffer is provided in the lower portion of the control rod guide tube 3, which accommodates the protective tube 4 that separates and drops from the control rod drive mechanism 27 in the event of an emergency shutdown. The dash ram 6 and dashpot 5 decelerate and stop the fall of the protecting tube 4, which includes the control rod elements 15. The neutron flux measuring unit 2 is mounted inside the dash ram 6. The control rod handling head 12, which is for being attached to the control rod drive mechanism 27 in order to insert and withdraw the control rod guide tube 3, is connected to the upper portion of the rod guide tube 3. The entrance nozzle 9, which is for introducing a reactor coolant flow into the control rod guide tube 3, is attached to the lower portion of the guide tube 3.

Each control rod element 15 comprises the cladding tube 18, which is made of stainless steel, in which are stacked the neutron absorber pellets 21 consisting of boron or the like. The upper portion of the control rod element 15 is provided with the upper end cap 17, and the lower portion is provided with the lower end cap 17' and the wire spacer 22. These end caps 17, 17' are for fixing and supporting the control rod elements in the protecting tube 4 and serve to plug the ends of the cladding tube 18. The plenum spring 19 and spacer 20 for setting and retaining the neutron absorber pellets 21 are provided inside the control rod element 15.

In the embodiment described above, the neutron flux measuring unit 2 is arranged inside the buffer (dash ram) 6. However, the invention is not limited to this embodiment, for it is possible to select any position in the axial direction for measurement purposes by appropriately choosing the location of installation. It is possible to grasp the in-core neutron flux distribution with sufficient accuracy not only in a homogeneous core but also in an axially heterogeneous core and diametrically heterogeneous core.

Furthermore, though the measurement position can be fixed as much as possible by disposing the neutron flux measuring unit in the backup shutdown rod 1, the invention is not so limited. The neutron flux measuring unit can be disposed in other control rod assemblies such as the coarse rods or fine rods, or neutron flux measuring units can be dispersed throughout the core by making joint use of a plurality of these control rods.

The neutron flux measuring unit used should at the very least be one which does not readily deteriorate during the control rod assembly exchange interval.

As shown in FIG. 2, an instrumentation cable for the neutron flux measuring unit is passed through the instrumentation cable guide tube at the center of the backup shutdown rod and is drawn out at the upper mechanism of the core. This makes it possible to minimize the amount of neutron irradiation received by the instrumentation cable.

Thus, in accordance with the present invention as described above, the control rods themselves occupy a single assembly portion in the core and one or a plurality of the neutron flux measuring units are arranged in the control rod assemblies dispersed within the core. As a result, it is possible to reliably and accurately grasp, with a quick response, a change in in-core neutron flux even in a large-size heterogeneous core of a demonstration-class reactor. Furthermore, by using a control rod assembly as a backup shutdown control rod, the measurement position can be fixed to the greatest extent possible. Moreover, the amount of neutron irradiation sustained by the instrumentation cable can be minimized by passing the cable through the center of the control rod assembly.

As many apparently widely different embodiments of the present invention can be made without departing from the spirit and scope thereof, it is to be understood that the invention is not limited to the specific embodiments thereof except as defined in the appended claims.

What we claim is:

1. A fast breeder reactor having a core, a control rod assembly positioned therein, and a first guide tube above said core, said control rod assembly having a control rod means with dash rams arranged for vertical movement therein along a plurality of second guide tubes having dashpots located at the bottom portion of said core, said fast breeder reactor comprising a neutron flux measuring unit arranged on one of said dash rams of said control rod assembly at a predetermined location substantially within at least one of said second guide tubes of said control rod means, said neutron flux measuring unit being pulled upward in said first guide tube during reactor operation and being located at the center of said core while said dashpots remain at the bottom portion of said core to thereby directly and precisely measure neutron flux in said reactor core, and to thereby preclude hampering the dropping of said control rod means during emergency reactor shutdown when said dash rams fall and are received by said dashpots.

2. The fast breeder reactor according to claim 1, wherein said control rod assembly is a backup shutdown rod.

3. The fast breeder reactor according to claim 1, further comprising an instrumentation cable for said neutron flux measuring unit which is passed through a central portion of the control rod assembly and lead out to an upper portion of the core.

* * * * *